United States Patent Office 3,473,202
Patented Oct. 21, 1969

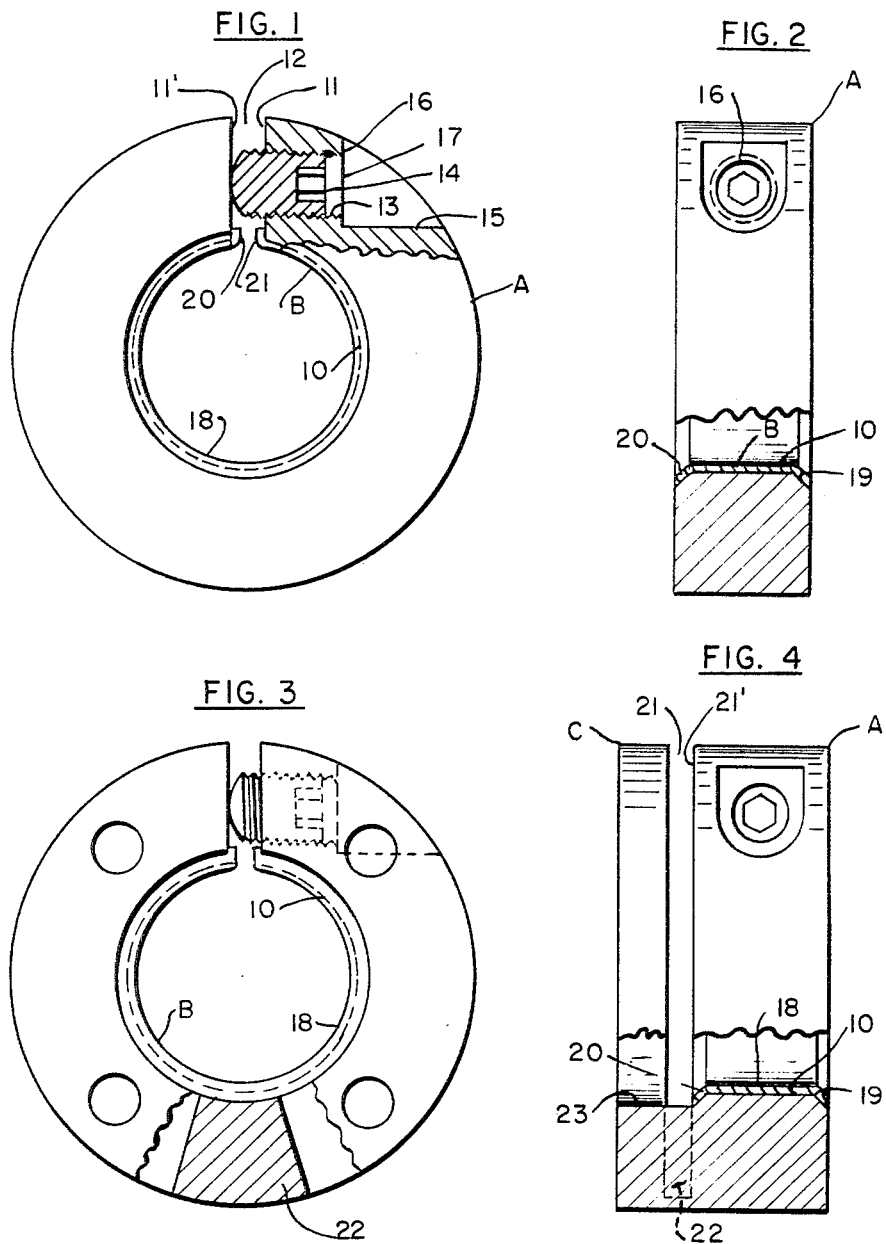

3,473,202
PRESTRESSED SHAFT ENGAGING UNIT
Reginald C. Howard, Los Angeles, Calif., assignor to Kolock Products Company, Lutherville, Md.
Filed Sept. 29, 1967, Ser. No. 671,815
Int. Cl. A44b 21/00
U.S. Cl. 24—257        3 Claims

ABSTRACT OF THE DISCLOSURE

A retracting collar-like element for gripping a shaft wherein the gripping surface of the element is provided with a surface of a contrasting material from that of the shaft.

---

The present invention relates to an improvement in the prestressed shaft gripping element, hereinafter referred to as a collar, as described in prior Patents 3,042,433 and 3,127,202. It is particularly desirable for use as a thrust collar to locate accurately and to secure machine elements on a shaft acting to sustain relatively large thrust loads without slippage and without auxiliary devices such as shaft shoulders, threaded nuts, snap rings and snap ring grooves. Another variation of the collar has an integral power take off flange, hereinafter referred to as the flange, attached in such a way as to act independently from the springing action of the collar. This combination will hereinafter be referred to as the torque collar. It is particularly useful for attaching pulleys, cams, gears, and the like, without keys or keyways or other auxiliary devices. Combined thrust and torque loads may be transmitted from the shaft to the collar to the flange and finally to the pulley, gear, etc. which is screw connected to the flange. The friction grip of the collar to the shaft is extremely great. The collar, manufactured from pretempered medium high strength steel, is sprung to the elastic limit of the material and is bored in the sprung position to size for slip fit assembly on the shaft. The collar once on the shaft is locked in place by backing the spreading screw out of the threaded hole, to cause the maximum obtainable pressure from the collar for gripping the shaft.

The surface irregularities imbed themselves microscopically into the shaft or the collar whichever is softer. Viewing the shaft under a microscope, after the shaft and collar have been loaded to a slipping condition, the fine cutting threads generated by the lathe cutting tool in boring the hole may be seen impressed on the shaft. The primary object of the invention is to improve the holding power, i.e. thrust, torque or a combination of the two by interposing a thin split sleeve of softer material between the bored surface of the collar and the shaft to which the collar is locked. Thus under the extreme gripping pressure exerted by the collar, the sleeve material will flow more effectively into the microscopic irregularities of the contacting surface of the collar and the shaft. The best material discovered by test is a high strength aluminum which is soft enough to flow into the surface irregularities of the steel elements but once implaced will develop the highest possible shear stresses when load is applied to the collar. When this sleeve is used in combination with the collar the holding power is nearly doubled. Though the best sleeve material was found to be 6061–T6 or 7071–T6 aluminum the invention is not limited to these materials. With the torque collar a brake lining material may be desirable for the sleeve material. Thus a slip clutch action would develop for overload protection.

Another object of the invention is to provide rolled ends in the sleeve displaced into the chamfered portion of the ends of the bored portion of the collar. This serves as a means for retaining the sleeve in the collar during handling and assembly of the collar and to assure that slippage will occur between the sleeve and the shaft.

Another object of the invention is to provide lug projections, at the radial extremities of the split sleeve, into the slot portion of the collar. This is to provide radial positioning of the sleeve relative to the collar and to assure rotative slippage will occur between the shaft and the sleeve.

Another object of the invention is to bond, weld or otherwise secure the thin sleeve to the collar. Also there is assurance of maximum surface contact of the sleeve with the collar. The split in the sleeve could otherwise be radially located away from the split portion of the collar. With maximum surface contact we would achieve maximum holding power.

In the drawings:

FIGURE 1 is an end elevation of the collar showing the thin split sleeve implaced and the radial ends of the sleeve projecting into the slot of the collar.

FIGURE 2 is a side elevation of the collar with the portion opposite the slot shown in cross section and the ends of thin sleeve formed into the chamfered portions of the collar.

FIGURE 3 is an end elevation of the other embodiment, the torque collar, with the integrally joined flange and showing the thin sleeve emplaced.

FIGURE 4 is a side elevation of the same device shown in FIGURE 3 with the thin sleeve shown emplaced.

In reference to the drawings, like numerals are used to designate like and similar parts throughout the several views.

Referring in particular to FIGURE 1 and FIGURE 2, the unit comprises a combination collar A and thin split sleeve B. The collar A operates in substantially the same manner as the collar described in prior Patent 3,042,433, that is, it consists of an annular ring formed preferably from high resilient steel, or other suitable material, having a hole 10 extending through its center. The ring is split, slot 12, along a line parallel with a plane passing through the axis of the collar about which it is adapted to rotate, leaving two adjacent abutting faces 11 and 11'. In face 11 is a threaded aperture 13 and threadably receivable within the aperture is a slot spreading screw 14. The collar has preferably a cut away portion 15 to facilitate tapping the hole 13 and inserting the screw 14. After the screw 14 is implaced the threaded hole is staked at 16. As will be described later, when the collar is locked on a shaft, screw 14 is free to turn in the hole. Staking the hole at 16 will prevent the screw from backing out of the hole 13.

A thin circular sleeve B is formed, having an inside diameter 18 equal to the shaft diameter about which the sleeve is adapted to engage. The sleeve is also split along a line parallel with a plane passing through its lateral axis. In manufacturing the collar A in combination with sleeve B, a suitable piece of steel stock is first bored to a size that when the sleeve is implaced, the inside diameter 18 will be slightly smaller than the shaft on which it is to be attached. The collar is then split (slot 12) and the aperture is made adjacent and perpendicular to face 11. Next the aperture is threaded and the screw 14 inserted. The screw 14 is turned into the hole 13, makes contact with slot face 11' and expands slot 12 and collar hole 10. The collar is expanded an amount equivalent to the elastic limit of the material. At this point the hole 10 is out of round and is rebored to a round. The size of the rebored hole 10 is two thicknesses of sleeve larger than the shaft to which it is to be adapted. The sleeve B is then slipped in place and with a suitable fixture, the two ends formed into chamfers 19 and 20 of the collar and the slotted ends formed against faces 11 and 11' to become projecting lugs 20 and 21. The sleeve B then becomes an integral part of the collar. Hole 18 of the sleeve then matches the shaft diameter for slip fit assembly. Another means of securing the sleeve B to the collar A would be by mechanical bonding and/or welding.

The other adaptation of sleeve B is to the torque collar as described in Patent Number 3,127,202. FIGURES 3 and 4 illustrate this adaptation. The torque collar consists of: Element A described above as the collar; Element B described above as the sleeve; Element C the flange; and the link 22 joining Elements A and C.

The collar A and flange C are separated partially by a slot 21 cut perpendicular to the axis of the collar, preferably beginning from the side of the collar containing the abutted ends to a point beyond the opposite side of the hole 10. This leaves an integral part 22 extending between the collar and the flange. While the flange is shown as separated by the slot 21, the torque collar may be constructed with the flange in direct contact with the side face 21' of the collar and secured thereto by welding the two elements together in a relatively small area similar to that shown at 22 for the integral formation of the elements or A and C may be fastened together by machine screws or bolts, etc. The flange is rebored to hole 23, a size larger than bore 10, to permit forming sleeve end 20 into the chamfers 19 and 20 provided on the collar.

The sleeve 18 is inserted into the bore of the collar and formed in place in a manner similar to that described above.

The material of the thin sleeve may be of a material suitable for frequent slippage on the shaft to act as a slip clutch when the applied torque to the collar exceeds a predetermined value. The engaging surface may be of a brake lining material or metallic hard plating applied to the aluminum sleeve. Thus other elements of a machine to which the torque collar may be adapted are protected from overloads such as a machine jam. The torque collar is then a new and unique type of compact slip clutch.

I claim:

1. A prestressed shaft gripping element having a circular opening therethrough and a radial slot extending from said opening to the outer edge of the element providing two opposed adjacent faces, means for moving the faces apart under stress for increasing the diameter of the opening in the gripping element, a bushing having an outside diameter corresponding to the diameter of the opening in the gripping element and positioned therein and an inside diameter of a size to fit over a shaft, said bushing having a slot therein for allowing expansion and contraction of the same at least to the degree of expansion and contraction of the gripping element, a concave peripheral outer surface on the bushing engaging a complementarily formed convex inner surface on the gripping element to prevent lateral displacement of the bushing movement of the bushing in the gripping element.

2. The structure defined in claim 1 in which bushing is further provided with outwardly extending radially disposed flanges adjacent the slot therein extending into the radial slot in the gripping element to prevent rotatable movement of the bushing in the gripping element.

3. The structure defined in claim 1 in which the concave outer peripheral surface of the bushing is formed by outwardly diverging flanges on the lateral edges thereof and the convex inner surface in gripping element is formed by chamfered surfaces on the edges of the circular opening therethrough against which surfaces the diverging flanges on the bushing fit.

References Cited

UNITED STATES PATENTS

| 491,872 | 2/1893 | Canfield. | |
| 3,109,663 | 11/1963 | Phillips | 287—52 XR |
| 3,127,202 | 3/1964 | Koen | 287—52 |
| 3,383,739 | 5/1968 | Pitzel. | |

DONALD A. GRIFFIN, Primary Examiner

U.S. Cl. X.R.

287—52